July 29, 1952 L. R. RISSLER ET AL 2,604,782
ELECTRIC ELEVATOR SYSTEM HAVING LOAD MEASURING DEVICES
Filed Nov. 19, 1948 3 Sheets-Sheet 1

INVENTORS
Lennius R. Rissler &
Joseph K. Kraft.
BY C. L. Friedman
ATTORNEY

July 29, 1952     L. R. RISSLER ET AL     2,604,782
ELECTRIC ELEVATOR SYSTEM HAVING LOAD MEASURING DEVICES
Filed Nov. 19, 1948                             3 Sheets-Sheet 2
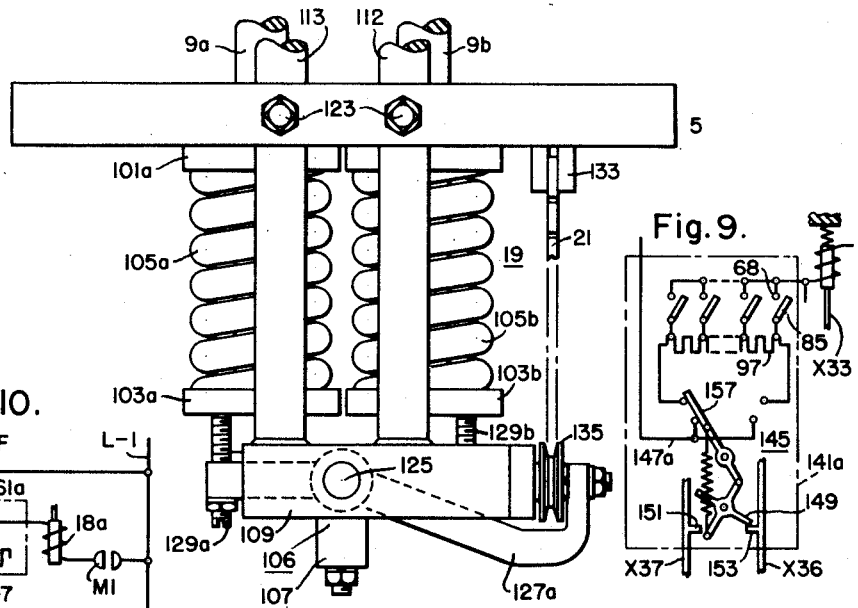
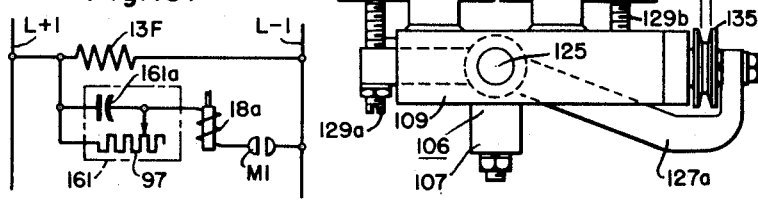
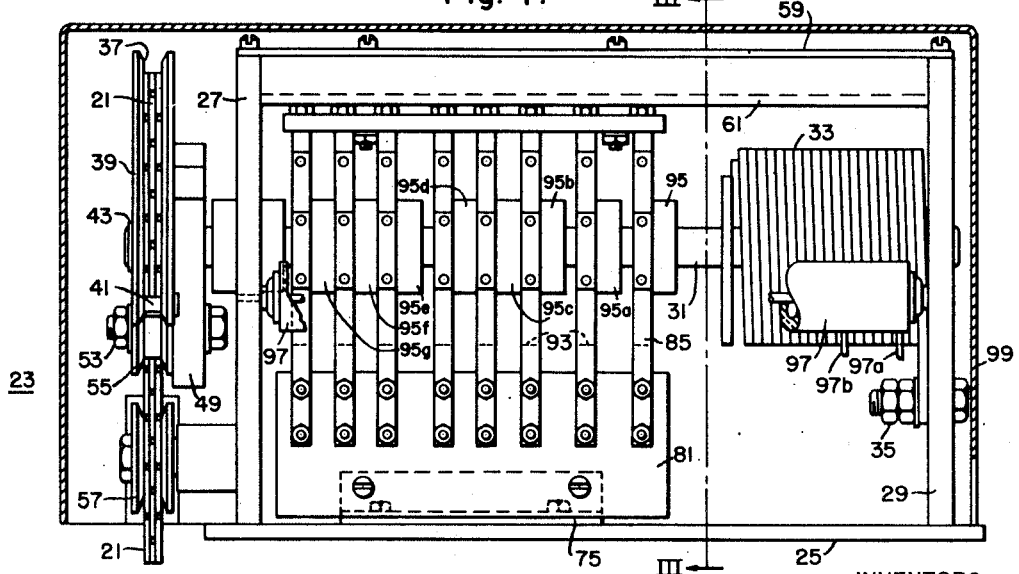
WITNESSES:
Robert C. Baird
Nw. C. Groone
INVENTORS
Lennius R. Rissler &
Joseph K. Kraft.
BY
C. L. Freedman
ATTORNEY Patented July 29, 1952

2,604,782

UNITED STATES PATENT OFFICE 2,604,782

ELECTRIC ELEVATOR SYSTEM HAVING LOAD MEASURING DEVICES

Lennius R. Rissler, Hohokus, and Joseph K. Kraft, Verona, N. J., assignors to Westinghouse Electric Corporation, East Pittsburgh, Pa., a corporation of Pennsylvania Application November 19, 1948, Serial No. 60,962

14 Claims. (Cl. 73—143)

This invention relates to load-determining devices and it has particular relation to elevator systems employing a load-determining device for controlling the operation of an elevator car.

In accordance with the invention, the load on a plurality of ropes or cables supporting an elevator car is ascertained by determining individually the load on each of the ropes. The individual loads are totalized to obtain a resultant output representing the total load on all of the ropes.

The resultant output representing the total load on the ropes may be employed in various ways. For example, an indicator may be provided for indicating the total load. As a further example, the resultant output may operate rotary switches or may vary impedance for control purposes. More specific illustrations of the application of the load-responsive device include the control of the time of brake release for elevator systems, particularly those of the relevelling type. Also, the device may be employed for controlling the time of brake application in an elevator system to facilitate accurate landing at any desired floor served by an elevator car regardless of the load carried by the car.

It is, therefore, an object of the invention to provide an improved load-determining device suitable for loads carried by multiple ropes or cables.

It is a further object of the invention to provide an improved load-determining device suitable for loads supported by multiple ropes wherein apparatus is provided for measuring the load on each of the ropes and for totalizing the individual load measurements.

It is a further object of the invention to provide an improved load determining device for totalizing the individual loads carried by multiple ropes and for operating a variable impedance device in accordance with the totalized load.

It is an additional object of the invention to provide an elevator system including a device for totalizing the loads in the individual ropes supporting an elevator car and including a brake for the elevator car having a time of application controlled in accordance with the totalized load ascertained.

It is also an object of the invention to provide an elevator system including apparatus for totalizing the individual loads in multiple ropes supporting an elevator car and including a brake for the elevator car having a time of release controlled by the totalized load so determined.

Other objects of the invention will be apparent from the following description taken in conjunction with the accompanying drawings in which:

Fig. 4 is a view in side elevation with parts broken away of the device illustrated in Fig. 2.

Fig. 5 is a view in side elevation with parts broken away of a load-determining device embodying the invention.

Fig. 9 is a schematic view showing a modification of the system illustrated in Fig. 8, and Fig. 10 is a schematic view of a portion of an elevator system illustrating a further embodiment of the invention.

Figure 1:
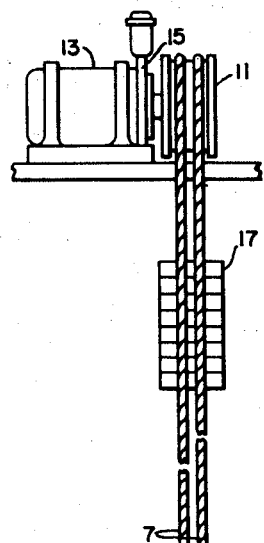
Fig. 1 is a view in elevation with parts omitted and parts broken away of an elevator system embodying the invention.

Referring to the drawings, Fig. 1 shows an elevator system which includes an elevator car 1 supported in a conventional sling 3. The sling has a hitch plate 5 for reception of a plurality of ropes or cables 7, two of which are shown in Fig. 1. The ropes are secured to the hitch plate through rods 9 to which the ropes are secured in any conventional manner, as by socketed connections.

The ropes 7 pass over a traction sheave 11 which is rotated by an electric motor 13. An elevator brake 15 is illustrated for stopping the elevator car and holding it at a desired floor. As hereinafter pointed out, suitable control equipment may be associated with the electric motor for operating the elevator car. The remaining ends of the ropes 7 are attached in a conventional manner to a counterweight 17.

In order to ascertain the load on the ropes 7, a load-determining device 19 is secured to the hitch plate 5. As hereinafter pointed out, the output of the load-determining device 19 may be employed in various ways. For present purposes, it will be assumed that the output of the load determining device is supplied through a flexible member 21 to a variable-impedance device 23. The impedance of the device 23 consequently is controlled in accordance with the load on the ropes 7. The impedance device 23 conveniently may be secured to the upper crossbar 3a of the sling 3.

Figure 2:
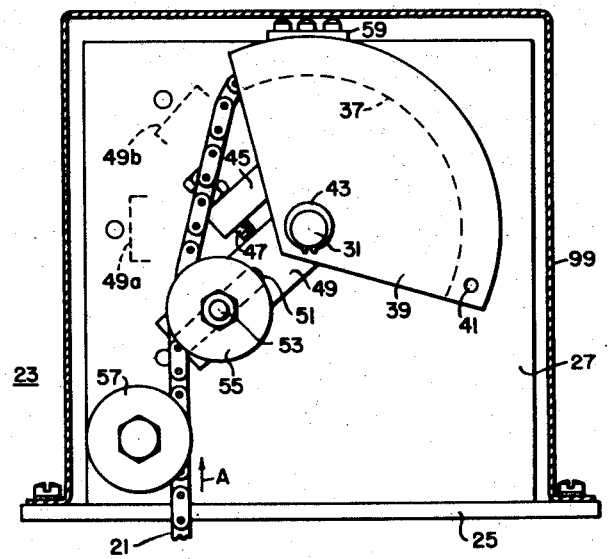
Fig. 2 is a view in end elevation with the cover broken away of a variable-impedance device embodying the invention.
Figure 3:
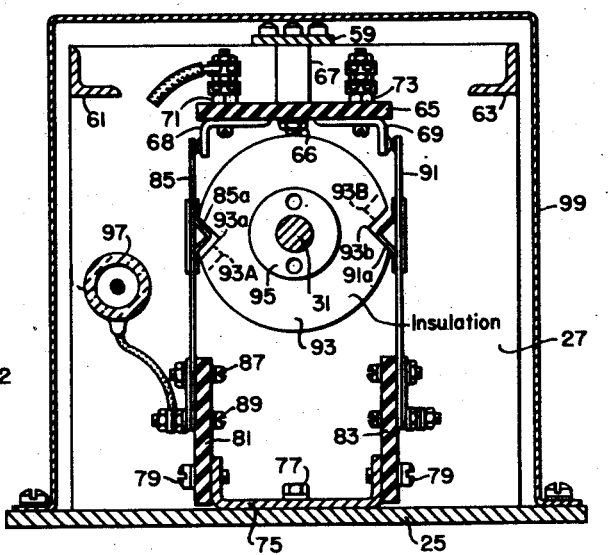
Fig. 3 is a view in cross-section taken along the line III—III of Fig. 4.

The variable-impedance device 23 is shown in greater detail in Figs. 2, 3, and 4. The device includes a bed plate 25 which has two spaced end plates 27 and 29 secured thereto. A shaft 31 extends between and through the end plates and is mounted for rotation relative to the end plates. The shaft is biased normally in a clockwise direction as viewed in Fig. 2 by means of a helical spring 33 (Fig. 4). This spring has one end secured to the end plate 29 by means of a bolt 35. The remaining end of the spring 33 is secured to the shaft 31 in any suitable manner.

The position of the shaft 31 is determined by the flexible member 21. This member may be constructed of any inextensible material such as flexible cable. In a preferred embodiment of the invention the flexible member takes the form of a flexible chain. An end of the chain extends around a peripheral groove 37 in a sector 39 and has its ends secured to the sector by means of a pin 41.

The sector 39 is mounted on the shaft 31 for rotation relative to the shaft, and is retained thereon by means of a split lock ring 43 disposed in a groove formed in the shaft. The sector 39 has secured thereto a bar 45 which has a cap screw 47 in threaded engagement therewith. This cap screw engages the surface of an arm 49. The arm is secured to the shaft 31 for rotation therewith and projects towards the chain 21. The arm 49 has a slot 51 therein through which a bolt 53 extends. The bolt 53 is employed for securing rotatably to the arm 49 a sheave 55. By adjusting the bolt 53 along the slot 51, the radial distance between the sheave 55 and the shaft 31 may be varied. The chain 21 passes through the peripheral groove in the sheave 55. An additional sheave 57 is rotatably secured to the end plate 27 for the purpose of guiding the chain 21.

It will be understood that the bias exerted by the spring 33 (Fig. 4) on the shaft 31 is in a direction maintaining the chain 21 taut. If the chain in Fig. 2 is permitted to move upwardly in the direction of the arrow A, the shaft 31 is moved by its bias in a clockwise direction. The angular movement of the shaft 31 is determined by the adjustment of the sheave 55 along its slot 49. The position of the sheave 55 with respect to the chain 21 may be adjusted by manipulation of the cap screw 47. The sector 39 permits substantial overtravel of the shaft 31 in a counterclockwise direction as viewed in Fig. 2, without loss of the effective connection between the chain and the sector.

If movement of the chain in the direction of the arrow A represents increasing load, the arm 49 is rotated in a clockwise direction towards a position represented by dotted lines 49a which, for example, may represent ½ of the rated load for which the system is designed or towards a position represented by dotted lines 49b which may represent the rated load of the system. Since the travel of the chain for a predetermined load variation may vary for different installations, it is desirable to assure a predetermined angular movement of the shaft 31 about its axis for all such installations. The desired angular movement may be obtained by adjusting the sheave 55 to change the effective arm between the axis of the sheave 55 and the axis of the shaft 31.

Rotation of the shaft 31 may be employed for operating various devices such as rotary electric switches and variable impedance elements. In the preferred embodiment of the invention herein illustrated, the shaft 31 is employed for operating a series of switches. Referring more particularly to Fig. 3, it will be observed that the end plates have secured thereto a strip 59 and reinforcing angles 61 and 63. A plate 65 of insulation, such as a phenolic resin, is secured to the strip 59 in any suitable manner, as by one or more bolts 66. A spacing collar 67 may surround each of the bolts for spacing the plate 65 from the strip 59. A pair of stationary electric contacts 68 and 69 are secured to the plate 65 by suitable terminal bolts 71 and 73.

A channel member 75 is secured to the bed plate 25 by means of one or more machine screws 77. This channel member has secured to its legs, by means of machine screws 79, two parallel spaced plates 81 and 83 of insulating material such as a phenolic resin. A movable spring contact 85 is secured to the plate 81 by means of bolts 87 and 89, and is resiliently biased towards engagement with the fixed contact 67. The bolt 89 also serves as a terminal bolt for receiving a conductor through which the movable contact is connected electroconductively to other components of an electric circuit.

In a similar manner a movable spring contact 91 is secured to the plate 83 and is biased towards engagement with the fixed contact 69.

For controlling the movement of the movable contacts into and out of engagement with their associated fixed contacts a cam disc 93 is secured to the shaft 31 in any convenient manner as through a collar 95. The disc 93 conveniently may be constructed of an insulating material such as a phenolic resin. The movable contact 85 has a cam follower 85a secured thereto which cooperates with the disc to control the movement of the movable contact. In a similar manner the movable contact 91 has a cam follower 91a secured thereto. The disc 93 has a cam configuration selected to open and close the associated switches at desired angular positions of the shaft 31. For example, the disc 93 has a notch 93a which permits movement of the movable contact 85 into engagement with its associated fixed contact. When the disc 93 is rotated away from the position illustrated in Fig. 3 the cam follower rises out of the notch 93a to force the movable contact 85 away from its fixed contact. The angular distance of movement of the disc 93 about the axis thereof for which the contacts 67 and 85 remain in engagement depends on the angular length of the notch 93a. A similar notch 93b is provided for cooperation with the cam follower 91a of the movable contact 91.

As hereinafter more fully pointed out, the switches may be employed for any desired control operation. In one embodiment certain of the switches, such as the switch represented by the contacts 85 and 68, may be connected to taps on a resistor 97 which may be in the form of a resistor tube through conductors. In this embodiment rotation of the shaft 31 results in a change in the effective portion of the resistance tube 97. A terminal 97a and tap 97b for the resistor are shown in Fig. 4.

It will be understood that as many switches as desired may be associated with the shaft 31. For example, in Fig. 4, seven collars 95a to 95g, similar to the collar 95, are mounted on the shaft 31. Each of these collars has a disc and switch contact assembly associated therewith which are similar to those described for the collar 95.

It will be understood that the various discs corresponding to the disc 93 of Fig. 3 may be mounted at different angular positions about the shaft 31 and that the cam configurations of the discs may be selected to provide the desired operation of the associated switches. For example, the notches on the cam disc associated with the collar 95a of Fig. 4 may have angular positions represented by dotted lines 93A and 93B in Fig. 3.

If desired, a cover 99 may be detachably secured to the bed plate 25 for the purpose of enclosing and protecting the device. As shown in Fig. 4, the cover projects from the bed plate 25 at one end to provide a port through which the chain 21 can pass.

Figure 6:
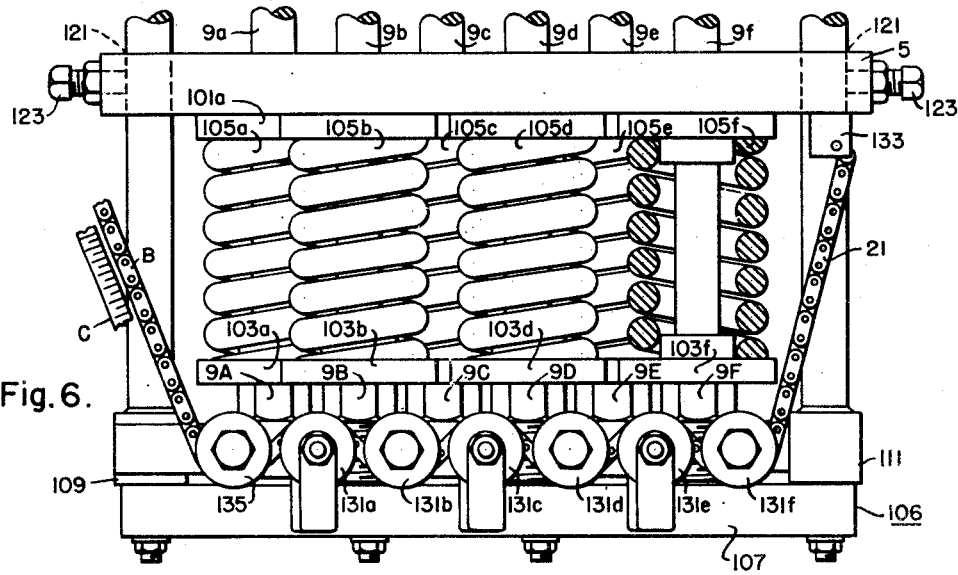
Fig. 6 is a view in front elevation with parts broken away of the device illustrated in Fig. 5.
Figure 7:
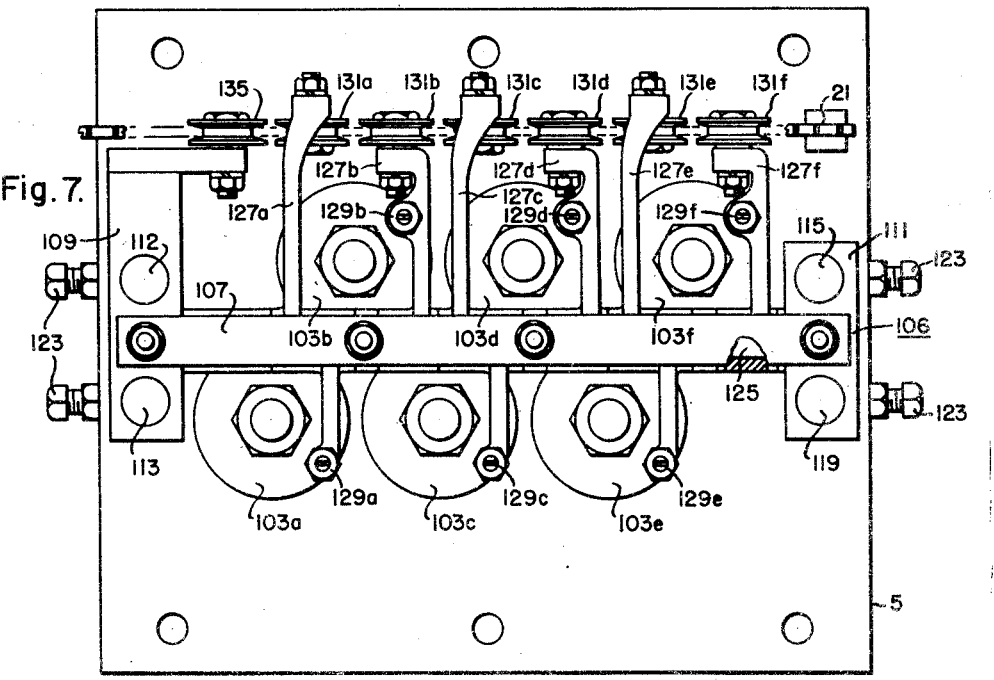
Fig. 7 is a view in bottom plan with parts broken away of the device illustrated in Fig. 5.

The load-determining device 19 is illustrated in detail in Figs. 5, 6 and 7. It will be assumed that the load-determining device is designed for an elevator car having six ropes or cables associated therewith. The six rods 9a to 9f in Fig. 6 correspond to the rods 9 in Fig. 1, and are arranged in two spaced parallel rows each containing three rods. These rods pass freely through the hitch plate 5 and have threaded ends for the reception of nuts 9A to 9F. Between the hitch plate 5 and the nut 9A, the rod 9a passes through two spaced washers 101a and 103a and a helical or coil spring 105a which is compressed between the two washers. In a similar manner helical springs 105b to 105f are associated with each of the rods 9b to 9f. By reference to Figs. 5 to 7, it is clear that each of the rods 9a to 9f is free to move relative to the hitch plate 5 independently of the remaining rods. Such movement to a limited degree is permitted by the individual helical springs associated therewith.

The load-determining device includes apparatus for individually determining the displacement of the washers 103a to 103f with respect to the hitch plate 5 and for totalizing these individual displacements. The resultant total represents the total load carried by the six ropes secured to the hitch plate 5. The mechanism for determining and totalizing the displacements includes a cradle 106 formed by a bar 107 having crossbars 109 and 111 secured thereto at each end. The crossbar 109 has secured thereto two pins 112 and 113 which project from the crossbar for a substantial distance. In a similar manner the crossbar 111 has projecting therefrom two pins 115 and 119.

The cradle is secured adjustably to the hitch plate 5. To this end the hitch plate has a separate opening 121 for snugly but slidably receiving each of the pins. The pins are held in adjusted position by means of a suitable setscrew 123.

A shaft 125 extends between the crossbars 109 and 111 and is secured thereto. Six levers 127a to 127f are mounted on the shaft 125 for independent rotation about the axis of the shaft. Each of the levers is responsive to the displacement of one of the washers 103a to 103f. For example, the lever 127a has a projection which carries an adjustable screw 129a. The screw 129a engages the washer 103a and moves the lever 127a about its axis in accordance with movement of the washer 103a relative to the hitch plate 5. Similarly, the levers 127c and 127e carry screws 129c and 129e for engaging respectively the washers 103c and 103e.

The levers 127b, 127d, and 127f also have adjustable screws 129b, 129d, and 129f for engaging respectively the washers 103b, 103d, and 103f. However, it will be noted that the screws 129b, 129d, and 129f are located on the opposite side of the shaft 125 from the screws 129a, 129c, and 129e. Consequently, if all of the springs 105a to 105f were to be compressed simultaneously, the levers 127a, 127c, and 127e would rotate about the shaft 125 in a direction opposite to the direction of rotation of the remaining levers thereabout. The foregoing assumes, of course, that the adjusting screws 129a through 129f are biased against their associated washers.

The levers have associated therewith elements for guiding the flexible member or chain 21. In the specific embodiment herein illustrated, the elements take the form of sheaves 131a to 131f which are rotatably mounted on their respective levers 127a to 127f. By inspection of Figs. 5, 6 and 7, it will be observed that the sheaves are positioned substantially in a row and that their axes are substantially parallel to each other. It will be noted further that the sheaves 131a, 131c, and 131e are located on one side of the path of travel of the chain 21 whereas the remaining sheaves 131b, 131d, and 131f are located on the opposite side of the path of travel of the chain 21. An end of the chain 21 is secured in any suitable manner to an abutment 133 which is carried by the hitch plate 5. Preferably an additional guide sheave 135 is rotatably secured to a projection from the cross-bar 109 for guiding the chain adjacent the sheave 131a. Since the chain 21 is maintained taut by the spring 33 (Fig. 4), the spring acts through the chain to maintain the screws 129a to 129f biased in engagement with the washers 103a to 103f.

By inspection of Fig. 6, it will be observed that a mark B on the chain 21 will move in a downward direction if any of the sheaves 131b, 131d and 131f is moved in a downward direction, or if any of the sheaves 131a, 131c and 131e is moved in an upward direction. Conversely, the mark B will move in an upward direction if any of the sheaves 131a, 131c and 131e is moved in a downward direction or if any of the sheaves 131b, 131d and 131f is moved in an upward direction. Since the individual movements of these sheaves correspond to the movements of the associated washers 103a to 103f, it follows that the movement of the mark B depends on the total load on the six ropes associated with the hitch plate 5 and the loading may be shown on a suitable scale C positioned adjacent to the path of travel of the mark B.

By providing a separate lever and associated parts for each rope, the device may be designed for any desired number of ropes. For example if only four ropes are required, the levers 127e and 127f and the parts associated with these levers may be omitted. The remaining parts then could be uniformly distributed relative to the hitch plate.

The load-determining device may be adjusted readily for any installation. For example, by loosening the setscrews 123 the entire cradle supporting the shaft 125 and the associated levers may be adjusted bodily with respect to the hitch plate 5. In addition, each of the levers may be adjusted with respect to its associated one of the washers 103a to 103f by manipulation of the desired one of the screws 129a to 129f.

In the usual elevator installation the load distribution among the ropes may vary appreciably for various reasons. For example, variations in the diameter and stretch of the individual ropes, variations in the pitch diameter of the grooves in the various traction, deflector, secondary and car sheaves over which the ropes pass and variations in the diameter and shapes of the grooves in the various sheaves all contribute to the variation in the load distribution among the various ropes. Because of such variations, it is desirable that the load-determining device have an individual response to the load on each of the ropes and such individual response is provided in the compact mechanism illustrated in Figs. 5, 6, and 7.

The ropes are afforded substantial freedom by the load-determining device. Thus, rotations of the ropes, of the springs or of the washers associated with the springs have no effect on the operation of the device. For similar reasons the device can tolerate a substantial change in alignment of the ropes, such as the change which occurs in many elevator systems as the car approaches its top landing.

The load-determining device may be employed in various ways. For example, as shown in Fig. 6, the device may be employed directly for weighing the load on the elevator car and for indicating the load to the elevator operator. As a further example, the device may be employed for operating switches in accordance with load changes or for operating variable impedances for the purpose of controlling the time of application of the elevator brake or the time of release of the elevator brake. Certain applications of the load-determining device to elevator systems now will be discussed in detail.

In the White et al. Patent 1,931,564, an elevator system is described which employs two load-responsive devices which are identified in the patent by the reference characters 43 and 52. The load-responsive device 43 is employed in the patent for adjusting the resistance value of the brake-discharge resistor in accordance with the load on the elevator car. The load-responsive device 52 is employed for operating a by-pass relay when the elevator car is fully loaded. These load-responsive devices may be replaced by the load-responsive devices herein described in the manner illustrated in Fig. 8.

Figure 8:
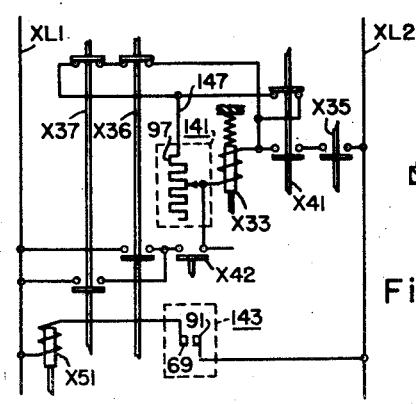
Fig. 8 is a schematic view with parts broken away of an elevator system embodying the invention.

Fig. 8 represents a system exactly similar to that shown in Fig. 7 of the aforesaid White et al. patent except for the replacement of the load-determining devices 43 and 52 of the White et al. patent by load-determining devices 141 and 143. Only so much of the White et al. Fig. 7 is shown here in Fig. 8 as is necessary to illustrate the changes. The reference characters X36, X37, X33, X41, X42, X35, X51, XL1, and XL2 of Fig. 8 designate parts similar to parts designated in the aforesaid White et al. patent by the same reference characters with the prefix X omitted.

Referring first to the load-determining device 143 of Fig. 8, this device includes the devices 19 and 23 of Fig. 1. In this case, however, the disc 93 (Fig. 3) is adjusted to permit engagement of the contacts 69 and 91 when the elevator car attains its full loading. At such time the contacts engage to energize the by-pass relay X51 (Fig. 8). As explained in the aforesaid White et al. patent operation of the by-pass relay prevents the stopping of the elevator car in response to operation of a hall push button.

The purpose of the adjustable resistor 97 (Fig. 8) is to vary the resistance of the discharge circuit for the release coil of the brake 15 in accordance with the elevator load. As explained in the aforesaid patent, proper adjustment of the resistance of the discharge circuit enables the car to come to an accurate stop at a desired floor regardless of the loading of the car. The device 141 (Fig. 8) also comprises the devices 19 and 23 shown in Fig. 1.

When employed in the system of Fig. 8, the previously-described resistance tube 97 (Fig. 3) may have taps connected to various switches operated successively by rotation of the shaft 31. The various switches thus operate as the adjustable tap of Fig. 8. The effective portion of the resistance represented by the resistor tube 97 which is connected in the brake discharge circuit, as illustrated in Fig. 8, consequently is varied as a function of the car loading. The variation may be selected to assure accurate landing of the car regardless of the car loading.

The effect of car loading may differ appreciably for up-travel and down-travel of the elevator car. During the up-travel of the car the effect of load is to retard the elevator car. During down-travel a load on the elevator car may operate as an over-hauling load to increase the speed of the elevator car. Under such circumstances the device 141 of Fig. 8 may be suitable for only one direction of travel of the car.

If desired, separate variable impedances may be operated by the load-determining device 19 and may be connected in circuit for up-travel and down-travel respectively of the associated car. One solution is illustrated in Fig. 9.

Fig. 9 represents a system similar to that illustrated in Fig. 8 except for the connections of the resistor tube 97. The changes are located within the broken-line rectangle 141a which replaces the device 141 of Fig. 8.

By reference to the aforesaid White at al. patent it will be found that the reversing switches X36 and X37 determine the direction of travel of the elevator car. These switches may be employed for actuating a snap-acting switch which is illustrated in Fig. 9 as a toggle switch 145. In one position the switch connects the left-hand end of the resistor tube 97 to the conductor 147a (which corresponds to the conductor 147 of Fig. 8) whereas in the other position of the switch 145 the remaining end of the resistor tube 97 is connected to the resistor 147a. The switch 145 has an operating member 149 which is pivoted for rotation about a stationary pivot and which has its ends positioned respectively adjacent lugs 151 and 153, carried by the switches X37 and X36 respectively. With the parts in the positions illustrated in Fig. 9, operation of the switch X36 in an upward direction moves the operating member 149 about its pivot to carry the knee of the toggle across the line of action of the spring 155. The movable contact 157 of the switch thereupon swings in a clockwise direction about its stationary pivot to connect the right-hand end of the resistor tube 97 to the conductor 147. Toggle switches of this general type are well known in the art. From the foregoing it is clear from Fig. 9 that if the resistor 97 is connected to present a discharge circuit to the coil of the brake X33, which increases in resistance with the load on the elevator car during down-travel of the elevator car, the connections for up-travel of the elevator car will be such that the resistance of the discharge circuit decreases as the load on the car increases. By proper selection of the taps on the resistor tube and by proper selection of the angle of the operating shaft at which the various taps are connected in circuit, the embodiment of Fig. 9 operates to provide accurate landings for all elevator car loadings.

A further embodiment of the invention will be discussed with reference to the Williams et al. Patent 2,238,614. When an elevator car starts, a substantial time is required for the elevator motor to develop a torque sufficient to support the car and its load. If the brake releases prior to the development of such torque, the elevator car may move away from a landing in a direction opposite to the desired direction of travel. Such movement is particularly objectionable in elevator systems of the relevelling type.

In accordance with the embodiment of Fig. 10, the release of the elevator brake is varied in time as a function of the loading of the elevator car for the purpose of preventing brake release until the motor torque has built up to a value sufficient to hold the elevator car. Fig. 10 represents a system exactly similar to the system illustrated in Fig. 1 of the Williams et al. patent except for the addition of a device 161. For this reason Fig. 10 shows only a part of the complete system illustrated in Fig. 1 of the Williams et al. patent sufficient to illustrate the invention. The reference characters L+1, L—1, 13F, 18a, and M1 represent the same components in Fig. 10 and in Fig. 1 of the Williams et al. patent.

In Fig. 10 the brake release coil 18a upon closure of the contact M1 is energized through a time-delay circuit which is represented in Fig. 10 by a capacitor 161a connected in parallel with the resistor 97. The time delay introduced into such a parallel circuit is a function of the product of the resistance of the resistor 97 and the capacitance of the capacitor 161a. The resistor 97 of Fig. 10 is the resistor tube of the device 23 (Fig. 1) and the effective value thereof is varied as a function of the loading of the elevator car by means of the load-determining device 19 (Fig. 1). The cams on the shaft 31 associated with the resistor 97 (Fig. 3) are so positioned with respect to their associated switches that as the loading of the elevator car increases the effective value of the resistance of the resistor 97 is increased. This corresponds to an increase in the effective value of resistance of the resistor 97 of Fig. 10 as the loading increases. Since the time delay introduced by the capacitor and resistor increases with an increase in resistance, it follows that the release of the brake is delayed more and more as the loading of the car increases. This is in the desired direction for the reason that the time required for the motor to build up to the torque required to hold the car increases with the loading of the car.

Although the invention has been described with reference to certain specific embodiments thereof, numerous modifications are possible falling within the spirit and scope of the invention.

We claim as our invention:

1. In a hitch assembly, a plurality of stress transmitting parts, a hitch plate, a separate spring interposed between each of the stress transmitting parts and the hitch plate for resiliently transmitting stress between the parts and the hitch plate, an elongated flexible member disposed in a variable path, a plurality of first and second elements spaced along the path of the flexible member, said first and second elements alternating along said path and engaging the flexible member on opposite sides of the path, means mounting the first elements for movement individually in accordance with compressive and expansive displacements of separate first ones of said springs relative to the second elements to vary the path of the flexible member, and translating means responsive to variation in the path of the flexible member.

2. In a hitch assembly, a plurality of stress transmitting parts, a hitch plate, a separate spring interposed between each of the stress transmitting parts and the hitch plate for resiliently transmitting stress between the parts and the hitch plate, an elongated flexible member, a plurality of grooved elements spaced along the flexible member, each pair of successive elements engaging opposite sides of the flexible member, a plurality of levers pivotally secured to the hitch plate, each of said levers mounting a separate one of the elements for movement about the axis of the associated lever, each of said levers having a portion positioned for movement in accordance with movement of an end of a separate one of the springs relative to the hitch plate, the portions on the levers mounting successive ones of said elements being positioned to move the elements in opposite directions in response to similar displacements of the associated springs, and translating means responsive to the displacement of the flexible member by the elements.

3. In an elevator system, an elevator car, a plurality of ropes for supporting the car, a plurality of springs, each of the springs being connected in series with a separate one of the ropes for displacing the ends of each of the springs relative to each other in accordance with the loading of the associated one of said ropes, a plurality of elements each associated with a separate one of the springs for movement in accordance with the relative movement of the ends of the associated spring, and means for adding the movements of said elements.

4. In a displacement-responsive device, a load unit, a plurality of load-supporting members for continuously supporting the load unit, independent yieldable means permitting displacement of each of the load-supporting members independently of the remaining load-supporting members relative to the load unit in accordance with the load carried by said each of the load-supporting members, and totalizing mechanism independently responsive to the displacement of each of the load-supporting members for continuously totalizing the displacements of the load-supporting members, to provide a quantity representative of the load of the load unit.

5. In a displacement-responsive device, an elevator car, a plurality of load-supporting ropes for supporting the elevator car, yieldable means permitting displacement of each of the load-supporting ropes relative to the elevator car in accordance with the load carried by said each of the load-supporting ropes, and totalizing mechanism independently responsive to the displacement of each of the load-supporting ropes for totalizing the displacements of the load-supporting ropes to provide a quantity representative of the load of the elevator car, said totalizing mechanism comprising a flexible member, means responsive to the displacement of each of the load-supporting ropes for independently controlling the configuration of the flexible member, and translating means responsive to the relative positions of two spaced points on the flexible member.

6. In a hitch assembly, a plurality of stress transmitting parts, a hitch plate, a separate spring interposed between each of the stress transmitting parts and the hitch plate for resiliently transmitting stress between the parts and the hitch plate, an elongated flexible member disposed in a variable path, a plurality of first and second elements spaced along the path of the flexible member, said first and second elements alternating along said path and engaging the flexible member on opposite sides of the path, means mounting the first elements for movement individually in accordance with compressive and expansive displacements of separate first ones of said springs relative to the second elements to vary the path of the flexible member, translating means responsive to variation in the path of the flexible member, and individual means for adjusting each of the elements relative to its associated spring.

7. In a hitch assembly, a plurality of stress transmitting parts, a hitch plate, a separate spring interposed between each of the stress transmitting parts and the hitch plate for resiliently transmitting stress between the parts and the hitch plate, an elongated flexible member disposed in a variable path, a plurality of first and second elements spaced along the path of the flexible member, said first and second elements alternating along said path and engaging the flexible member on opposite sides of the path, means mounting the first elements for movement individually in accordance with compressive and expansive displacements of separate first ones of said springs relative to the second elements to vary the path of the flexible member, translating means responsive to variation in the path of the flexible member, and means mounting the second elements for movement individually in accordance with compressive and expansive displacements of separate second ones of said springs relative to the second elements to vary the path of the flexible member, said mounting means being constructed to move the first elements in a first direction and the second elements in a second direction opposite to the first direction in response to simultaneous similar displacements of all of said springs.

8. In a hitch assembly, a plurality of stress transmitting parts, a hitch plate, a separate spring interposed between each of the stress transmitting parts and the hitch plate for resiliently transmitting stress between the parts and the hitch plate, an elongated flexible member disposed in a variable path, a plurality of first and second elements spaced along the path of the flexible member, said first and second elements alternating along said path and engaging the flexible member on opposite sides of the path, means mounting the first elements for movement individually in accordance with compressive and expansive displacements of separate first ones of said springs relative to the second elements to vary the path of the flexible member, translating means responsive to variation in the path of the flexible member, and individual means for adjusting the position of each of the first elements relative to the associated one of the springs.

9. In a hitch assembly, a plurality of stress transmitting parts, a hitch plate, a separate spring interposed between each of the stress transmitting parts and the hitch plate for resiliently transmitting stress between the parts and the hitch plate, an elongated flexible member, a plurality of grooved elements spaced along the flexible member, each pair of successive elements engaging opposite sides of the flexible member, a plurality of levers pivotally secured to the hitch plate, each of said levers mounting a separate one of the elements for movement about the axis of the associated lever, each of said levers having a portion positioned for movement in accordance with movement of an end of a separate one of the springs relative to the hitch plate, the portions on the levers mounting successive ones of said elements being positioned to move the elements in opposite directions in response to similar displacements of the associated springs, and translating means responsive to the displacement of the flexible member by the elements, said portions comprising adjustments each individually effective for adjusting the position of the associated lever about its axis relative to the hitch plate.

10. In a hitch assembly, a plurality of stress transmitting parts, a hitch plate, a separate spring interposed between each of the stress transmitting parts and the hitch plate for resiliently transmitting stress between the parts and the hitch plate, an elongated flexible member, a plurality of grooved elements spaced along the flexible member, each pair of successive elements engaging opposite sides of the flexible member, a plurality of levers pivotally secured to the hitch plate, each of said levers mounting a separate one of the elements for movement about the axis of the associated lever, each of said levers having a portion positioned for movement in accordance with movement of an end of a separate one of the springs relative to the hitch plate, the portions on the levers mounting successive ones of said elements being positioned to move the elements in opposite directions in response to similar displacements of the associated springs, translating means responsive to the displacement of the flexible member by the elements, said levers being mounted for rotation on a common shaft, and means for adjusting the shaft relative to the hitch plate.

11. In a hitch assembly, a plurality of stress transmitting parts, a hitch plate, a separate spring interposed between each of the stress transmitting parts and the hitch plate for resiliently transmitting stress between the parts and the hitch plate, an elongated flexible member, a plurality of grooved elements spaced along the flexible member, each pair of successive elements engaging opposite sides of the flexible member, a plurality of levers pivotally secured to the hitch plate, each of said levers mounting a separate one of the elements for movement about the axis of the associated lever, each of said levers having a portion positioned for movement in accordance with movement of an end of a separate one of the springs relative to the hitch plate, the portions on the levers mounting successive ones of said elements being positioned to move the elements in opposite directions in response to similar displacements of the associated springs, translating means responsive to the displacement of the flexible member by the elements, said levers being mounted for rotation on a common shaft, means for adjusting the shaft relative to the hitch plate, and adjustments each effective for adjusting individually a separate one of the elements about said common shaft relative to the associated spring.

12. In a hitch assembly, a plurality of stress transmitting parts, a hitch plate, a separate spring interposed between each of the stress transmitting parts and the hitch plate for resiliently transmitting stress between the parts and the hitch plate, an elongated flexible member, a plurality of groove elements spaced along the flexible member, each pair of successive elements engaging opposite sides of the flexible member, a plurality of levers pivotally secured to the hitch plate, each of said levers mounting a separate one of the elements for movement about the axis of the associated lever, each of said levers having a portion positioned for movement in accordance with movement of an end of a separate one of the springs relative to the hitch plate, the portions on the levers mounting successive ones of said elements being positioned to move the elements in opposite directions in response to similar displacements of the associated springs, translating means responsive to the displacement of the flexible member by the elements, the translating means comprising a rotor, means mounting the rotor for rotation relative to the hitch plate, means coupling the flexible member to the rotor at a point displaced from the axis whereby movement of the end of the flexible member about the axis of the rotor produces rotor rotations, and means connecting the remaining end of the flexible member to the hitch plate.

13. In a hitch assembly, a plurality of stress transmitting parts, a hitch plate, a separate spring interposed between each of the stress transmitting parts and the hitch plate for resiliency transmitting stress between the parts and the hitch plate, an elongated flexible member disposed in a variable path, a plurality of first and second elements spaced along the path of the flexible member, said first and second elements alternating along said path and engaging the flexible member on opposite sides of the path, means mounting the first elements for movement individually in accordance with compressive and expansive displacements of separate first ones of said springs relative to the second elements to vary the path of the flexible member, translating means responsive to variation in the path of the flexible member, individual means for adjusting each of the elements relative to its associated spring, and means for simultaneously adjusting all of the elements relative to the associated springs.

14. In a hitch assembly, a plurality of stress transmitting parts, a hitch plate, a separate spring interposed between each of the stress transmitting parts and the hitch plate for resiliently transmitting stress between the parts and the hitch plate, an elongated flexible member disposed in a variable path, a plurality of first and second elements spaced along the path of the flexible member, said first and second elements alternating along said path and engaging the flexible member on opposite sides of the path, means mounting the first elements for movement individually in accordance with compressive and expansive displacements of separate first ones of said springs relative to the second elements to vary the path of the flexible member, translating means responsive to variation in the path of the flexible member, individual means for adjusting the position of each of the first elements relative to the associated one of the springs, and means for simultaneously adjusting all of said first elements relative to the associated springs.

LENNIUS R. RISSLER.
JOSEPH K. KRAFT.

REFERENCES CITED

The following references are of record in the file of this patent:

UNITED STATES PATENTS

| Number | Name | Date |
| --- | --- | --- |
| 1,931,564 | White et al. | Oct. 24, 1933 |
| 2,238,614 | Williams et al. | Apr. 15, 1941 |
| 2,369,420 | Thurston et al. | Feb. 13, 1945 |
| 2,472,689 | Adams et al. | June 7, 1949 |

FOREIGN PATENTS

| Number | Country | Date |
| --- | --- | --- |
| 595,554 | France | July 20, 1925 |